US007532666B1

(12) United States Patent
Rezvani (10) Patent No.: US 7,532,666 B1
(45) Date of Patent: May 12, 2009

(54) METHOD AND APPARATUS FOR ERROR CORRECTION IN MULTI-LINE MULTI-TONE GIGABIT TRANSMISSION SYSTEMS

(75) Inventor: Behrooz Rezvani, San Ramon, CA (US)

(73) Assignee: Ikanos Communications Inc., Fremont, CA (US)

( * ) Notice: Subject to any disclaimer, the term of this patent is extended or adjusted under 35 U.S.C. 154(b) by 433 days.

(21) Appl. No.: 11/132,909

(22) Filed: May 18, 2005

Related U.S. Application Data (60) Provisional application No. 60/572,462, filed on May 18, 2004.

(51) Int. Cl.
H04B 1/38 (2006.01)
(52) U.S. Cl. .......................... 375/222; 375/260; 455/59
(58) Field of Classification Search .................. 375/260, 375/222; 455/59
See application file for complete search history.

(56) References Cited

U.S. PATENT DOCUMENTS

| | | | | |
|---|---|---|---|---|
| 5,379,305 A | * | 1/1995 | Weng | ......................... 714/774 |
| 5,701,304 A | * | 12/1997 | Glover et al. | ............... 714/710 |
| 6,035,000 A | * | 3/2000 | Bingham | .................... 375/296 |
| 7,088,781 B2 | * | 8/2006 | Betts | .......................... 375/260 |
| 2003/0227865 A1 | * | 12/2003 | Kratochwil et al. | ......... 370/201 |
| 2004/0096213 A1 | * | 5/2004 | Perkins et al. | ................ 398/27 |

* cited by examiner

*Primary Examiner*—Shuwang Liu
*Assistant Examiner*—Michael R Neff
(74) *Attorney, Agent, or Firm*—IP Creators; Charles C Cary (57) ABSTRACT

A multi-tone modem supporting multi-tone modulation protocols over multiple bundled transmission lines. The multi-tone modem is configured to transmit and receive communication channels each associated with a corresponding one of a plurality of transmission lines. The modem comprises at least one in-channel forward error correction component and a cross-channel forward error correction component. The at least one in-channel forward error correction component discretely encodes and decodes data from each communication channels transmitted and received over the plurality of transmission lines. The cross-channel forward error correction component encodes data from all communication channels and buffers the corresponding cross-channel redundancy symbols of each cross-channel codeword.

6 Claims, 7 Drawing Sheets

Cross Channel FEC Encoder  FIG. 6

FIG. 7                  Cross Channel FEC De-coder

METHOD AND APPARATUS FOR ERROR CORRECTION IN MULTI-LINE MULTI-TONE GIGABIT TRANSMISSION SYSTEMS

CROSS REFERENCE TO RELATED APPLICATION

This application claims the benefit of prior filed Provisional Application No. 60/572,462 filed on May 18, 2004 entitled "*Long Reach Gigabit Ethernet and SONET over CAT-5*" which is incorporated herein by reference in its entirety as if fully set forth herein.

BACKGROUND OF THE INVENTION

1. Field of Invention

The present invention is generally elated to modems, and more particularly to digital modems.

2. Description of the Related Art

A growing number of companies are deploying web communication systems which enable employees to work from home or office in locations across the world. These web communication systems feature IP telephony, streaming video and audio and large data transfers in the form of documents and other files needed for group collaboration. Within a single office location these needs may be relatively easily met with a combination of copper and optical transmission lines supporting gigabit and higher Ethernet traffic. Copper transmission lines in the form of what is known as category5 (CAT5) will support gigabit Ethernet. This ubiquitous inexpensive unshielded twisted pair (UTP) data grade cable however has the limitation of very short runs, typically less than 100 meters due to signal radiation and attenuation considerations. For distances greater than 100 meters an optical link is typically required.

Extending the reach of a companies network beyond the home office, e.g. to various branch offices and homes around the world presents additional obstacles. Many locations are currently provisioned with twisted pair copper subscriber lines and lack therefore a transmission line which supports gigabit Ethernet. To extend dedicated optical links to these locations would in many cases be prohibitively expensive.

What is needed are means for provisioning gigabit and higher Ethernet over legacy transmission lines such as subscriber lines and CAT5 cable.

SUMMARY OF THE INVENTION

A method and apparatus for a modem supporting multi-tone modulation protocols over multiple bundled transmission lines is disclosed. In representative embodiments of the invention the modem is configured to couple to two or more transmission lines and supports gigabit Ethernet and other high data rate communications. Typical transmission lines supported by the modem comprise two or more twisted pair subscriber lines or CAT 5 or other similar cable. The modem supports frequency division multiplexed communications in proprietary and standard multi-tone band plans such as those associated with discrete multi-tone (DMT) modulated X-DSL variants, e.g. ADSL and VDSL. In an alternate embodiment of the invention the modem supports orthogonal frequency division multiplexing (OFDM) communication protocols. The modem of the current invention provides the signal integrity required to support gigabit transmission rates.

In an embodiment of the invention a multi-tone modem is disclosed. The multi-tone modem is configured to transmit and receive communication channels each associated with a corresponding one of a plurality of transmission lines. The modem comprises at least one in-channel forward error correction component and a cross-channel forward error correction component. The at least one in-channel forward error correction component discretely encodes and decodes data from each communication channels transmitted and received over the plurality of transmission lines. The cross-channel forward error correction component encodes data from all communication channels and buffers the corresponding cross-channel redundancy symbols of each resulting cross-channel codeword.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A modem supporting multi-tone modulation protocols over multiple bundled transmission lines is disclosed. In representative embodiments of the invention the modem is configured to couple to two or more transmission lines. Typical such transmission lines will comprise two or more twisted pair subscriber lines or CAT 5 or other similar cable with two or more twisted pair lines. The modem supports frequency division multiplexed communications in proprietary and standard band plans such as those associated with X-DSL, i.e. ADSL and VDSL and variants thereof. Typically the individual tones/sub-channels are frequency division multiplexed across the available bandwidth. In an embodiment of the invention each sub-channel uses quadrature amplitude modulation (QAM) to modulate information.

In an alternate embodiment of the invention the modem supports orthogonal frequency division multiplexing (OFDM). In OFDM available bandwidth is subdivided into a number of discrete sub-channels that are overlapping and orthogonal to each other. Each channel has a corresponding frequency range. Data is transmitted in the form of symbols with a predefined duration. The data can be encoded in amplitude and/or phase, using encoding methods such as Binary Phase Shift Key (BPSK), Quadrature Phase Shift Key (QPSK), m-point Quadrature Amplitude Modulation (m-QAM).

All digital communication experiences signal interference, and communication protocols which support multiple sub-channels such as DMT and OFDM are no exception. Interference can effect both the amplitude and the phase of the sub-channels. Such noise can arise across the time and/or frequency domains. At the receiver the data has to be separated from the noise. One popular technique for achieving the separation of data from the noise in a received signal is known as in-channel forward error correction (FEC). FEC introduces additional redundant bits into communications between modems and additional processing overhead to handle the transmission and reception of a stream of digital information. The redundant bits are added at the transmitter by application of any of a number of FEC algorithms in a process known as encoding the data. At the receiver the same algorithm is performed to detect and remove errors in the transmitted data in a process known as decoding the signal. The primary benefit of FEC is that re-transmission is not required.

With each improvement in bandwidth of multiple sub-channel communication systems there is a corresponding increase in noise, with the potential to reduce signal integrity to unacceptable levels. The modem of the current invention provides the signal integrity required to support gigabit transmission rates.

In each of the Figures the reference numbers for elements introduced in each Figure correspond with the number of the Figure. For example elements referenced in FIG. 1 have reference numbers between 100-199. Elements referenced in FIG. 2 have reference numbers between 200-299, and so forth. For purposes of clarity elements first referenced in an earlier Figure may again appear in a subsequent figure.

Figure 1:
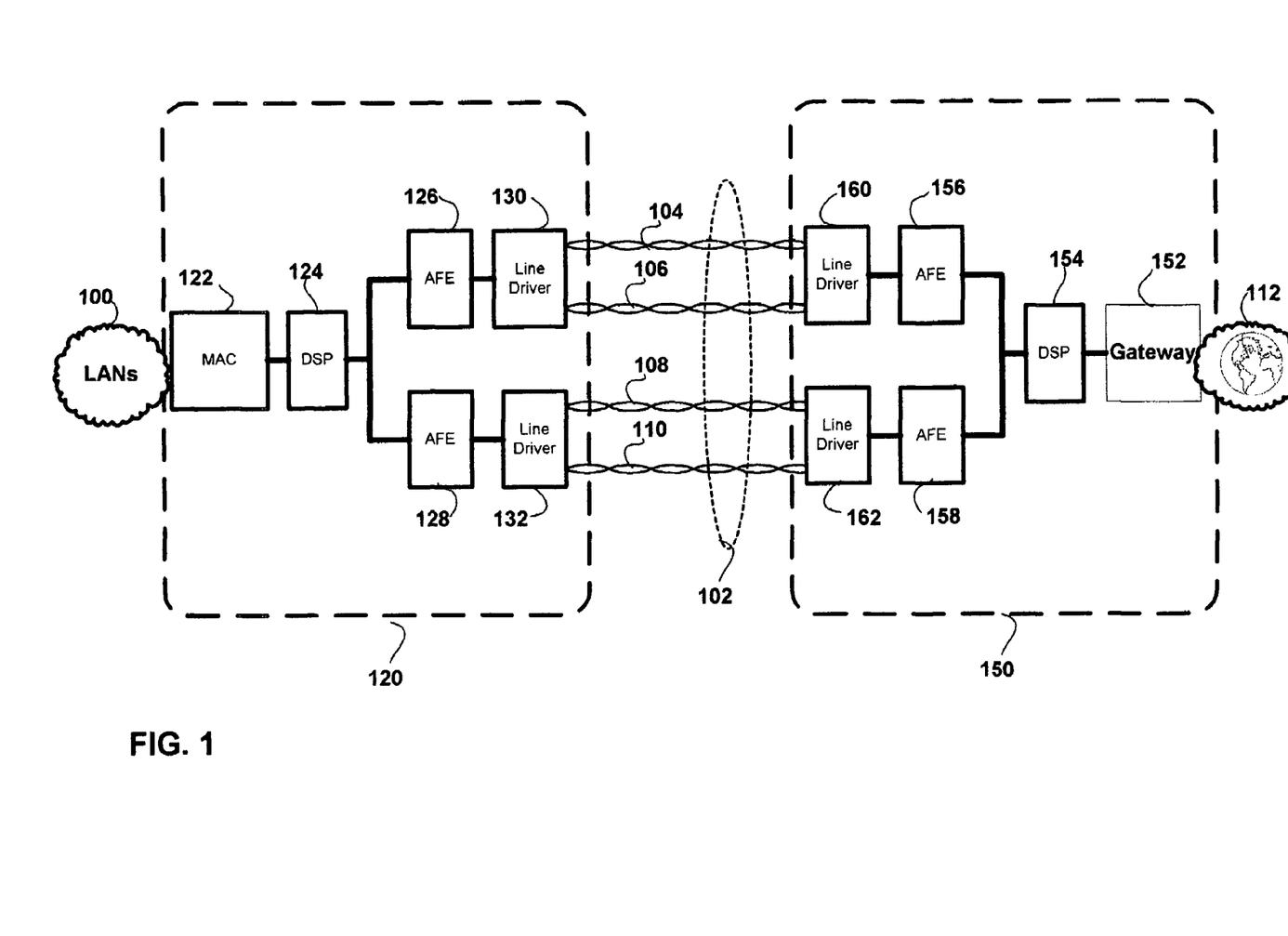
FIG. 1 is a hardware block diagram of an opposing transceiver pair in accordance with an embodiment of the current invention.

FIG. 1 is a hardware block diagram of an opposing transceiver pair configured to implement both in-channel and cross-channel forward error correction (FEC) in accordance with an embodiment of the current invention. The first transceiver system 120 includes a medium access control (MAC) 122 coupled to a communication network, e.g. local area network (LAN) 100. The MAC couples to a digital signal processor (DSP) 124. The DSP handles transmission and reception of communications over a bundle 102 of more than one transmission line. In the embodiment of the invention shown in FIG. 1 the DSP couples via AFE 126 and line drivers 130 to transmission lines 104-106 and via AFE 128 and line driver 132 to transmission lines 108-110. Transmission lines in an embodiment of the invention be individual subscriber lines between a remote access terminal and an office. In an alternate embodiment of the invention the transmission lines may be a CAT-5 cable with two or more twisted pairs of connections used for example within a building or office park. In the embodiment shown the bundle 102 includes four transmission lines 104, 106, 108, 110 each supporting their own communication channel for bi-directional duplex communication with the opposing remote transceiver 150 coupled to the other end of the four transmission lines.

The opposing transceiver 150 includes a gateway 152 coupled to a communication network, e.g. another LAN or wide area network (WAN) such as the Internet 112. The gateway couples to a DSP 154. The DSP handles transmission and reception of communications over the bundle 102 with the first transceiver 120 over the four transmission lines 104-110 within bundle 102. In the embodiment of the invention shown in FIG. 1 the DSP 154 couples via AFE 156 and line drivers 160 to transmission lines 104-106 and via AFE 158 and line driver 162 to transmission lines 108-110. The details of the cross channel FEC supported by both these transceivers are shown in the following FIGS. 4-7 and associated description.

Figure 2:
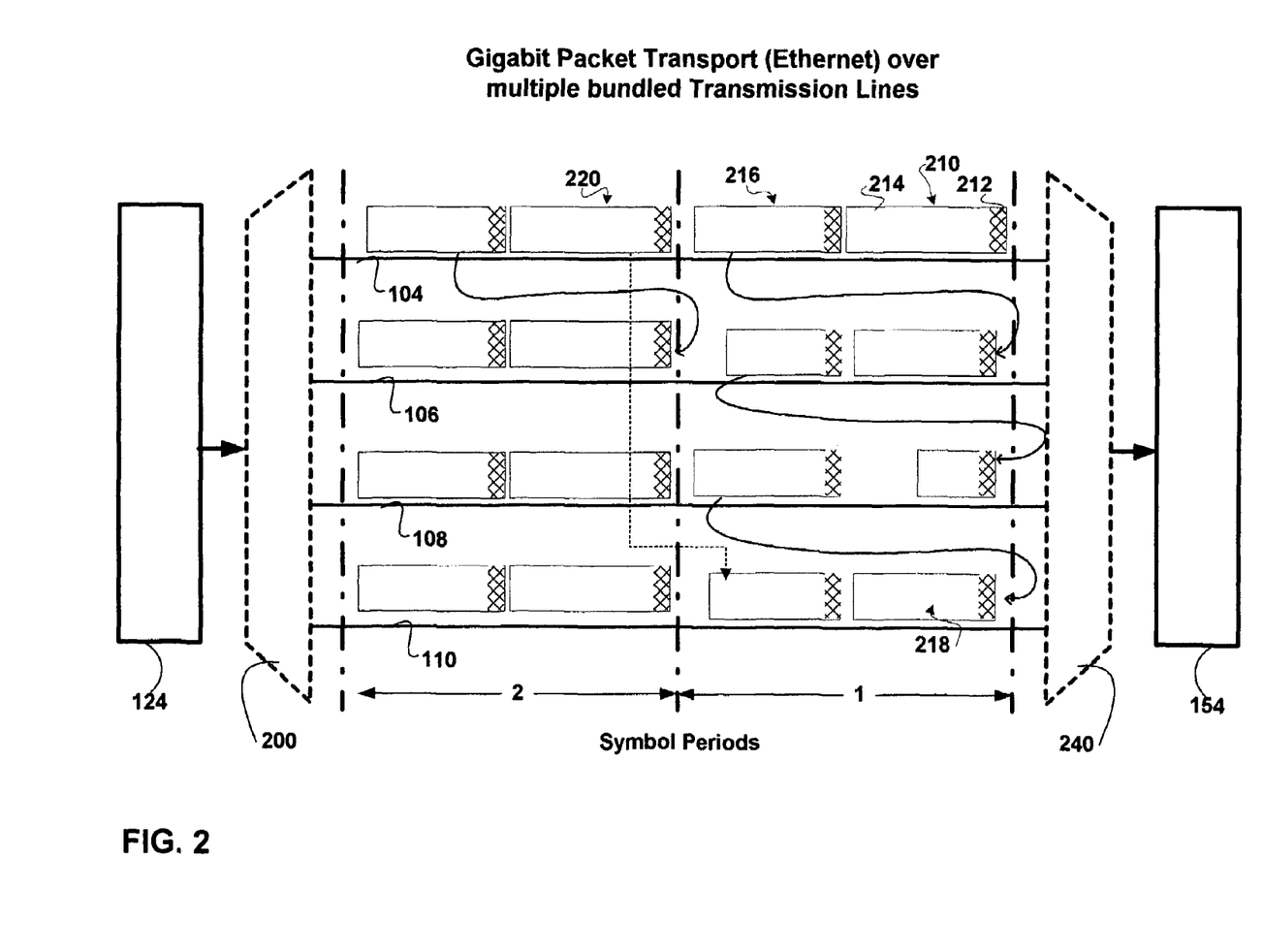
FIG. 2 shows the data structures associated with multiplexing and demultiplexing packet based network traffic, e.g. IEEE 802.x traffic across multiple transmission lines such as those shown in FIG. 1.

FIG. 2 shows the data structures associated with multiplexing and demultiplexing packet based network traffic, e.g. IEEE 802.x traffic between the opposing transceivers such as those shown in FIG. 1 over multiple transmission lines. In the embodiment shown four transmission lines 104, 106, 108, 110 (See FIG. 1) are utilized for transport. As packets are received by DSP 124 they are demultiplexed 200 across all four transmission lines 104-110. The demultiplexing is handled by the DSP. Packets in this embodiment of the invention are placed on each transmission line in each symbol interval in round-robin fashion. Various packets 210, 216, 218 and 220 are shown in the order in which they are placed on the individual channels supported on each transmission line. In this embodiment of the invention the packets are Ethernet packets conforming with the IEEE 802.x standard. Packet 210 includes an 802.x header 212 and payload 214. These packets are transported within the frame and super frame structure of a selected X-DSL or other high speed synchronous communication standard.

Figure 3A:
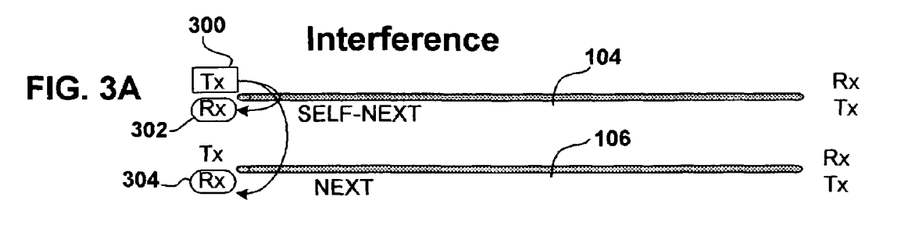
FIGS. 3A-C are hardware block diagrams showing various forms of internal and external interference exhibited between transmission lines in the bundle 102 shown in FIG. 1.
Figure 3B:
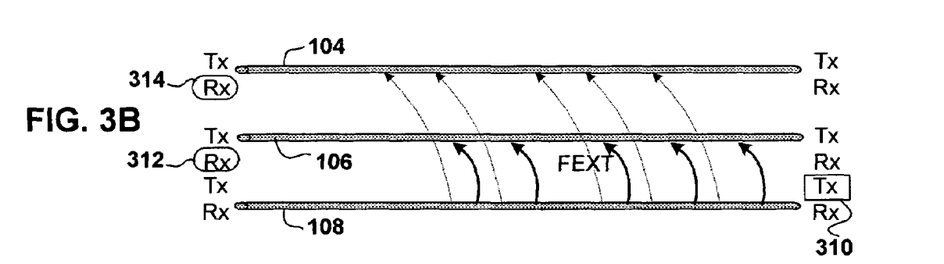
Figure 3C:
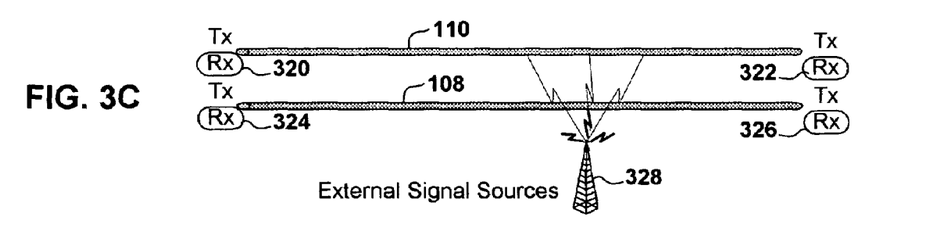

FIGS. 3A-C are hardware block diagrams showing various forms of internal and external interference exhibited between transmission lines in the bundle 102 shown in FIG. 1. FIG. 3A shows a category of interference defined as Near End Cross-Talk (NEXT). NEXT is defined as cross-talk effected between a transmitting path and a receiving path of transceivers at the same end of two different subscriber loops within the same bundle. Self-Next is defined as cross talk between the transmitter and receiver coupled to one end of a single subscriber line. FIG. 3A shows NEXT between the transmitter 300 on one end of transmission line 104 to the receiver 304 on the same end of the transmission line 106. Self-NEXT is also shown between the transmitter 300 and receiver 302 on the same end of transmission line 104.

FIG. 3B shows another category of interference defined as Far End Cross-talk (FEXT). FEXT is defined as cross talk between a transmitting path and a receiving path of transceivers at opposite ends of two different transmission loops within the same bundle. Self-FEXT is defined as cross talk between the transmitter and receiver at opposite ends of the same transmission line. FEXT is shown radiating from one to others of transmission lines 104, 106, 108 in a bundle. Specifically the transmitter 310 of transmission line 108 interferes in varying degrees with the reception of receivers 312, 214 on transmission lines 106 and 104 respectively. The amount of FEXT experienced by lines 104, 106 will depend in part by their proximity in the bundle to the interferor line, e.g. transmission line 108.

FIG. 3C shows interference from external source 328. The amount of interference with the reception of receivers 320-322 and 324-326 of transmission lines 110, 108 respectively will be determined in part by the proximity and shielding of each transmission line to the external signal source.

Figure 3D:
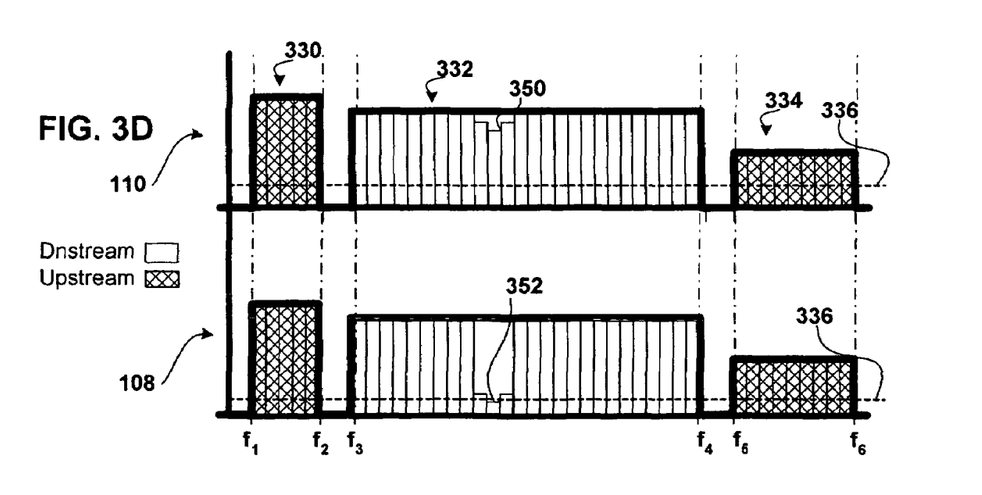
FIG. 3D is a graph diagram showing the corresponding spectral characteristics exhibited by the subscriber lines shown in FIGS. 3A-C.

FIG. 3D is a graph diagram showing the corresponding spectral characteristics in terms of power vs. frequency exhibited by the transmission lines subject to the interference shown in FIGS. 3A-C. The spectral characteristics for transmission lines 110-108 are shown. Both transmission lines implement the same multi-tone protocol and thus exhibit the same initial band-plan in terms of upstream 330, 334 and downstream 332 tones. Both transmission lines are shown initially implementing the same PSD mask 336 (solid line).

Both lines exhibit degradation in the bit loading of one or more of the sub-channels due to interference with the amount of degradation depending on several factors including the degree of electromagnetic coupling with the interference source. The graph for transmission line 110 exhibits a mild degradation in bit-loading in several of the downstream sub-channels 350. The graph for transmission line 108 exhibits a severe degradation in bit-loading in several of the downstream sub-channels 352 at least one of which exhibits a bit loading below a threshold value 336 of for example 1-2 bits per Hertz per sub-symbol. Even though bit loading is severely reduced on line 108 in the effected sub-channels 352 the transmit power applied to each of these sub-channels remains at the corresponding power lever dictated by the PSD mask 300 (solid line).

Figure 4A:
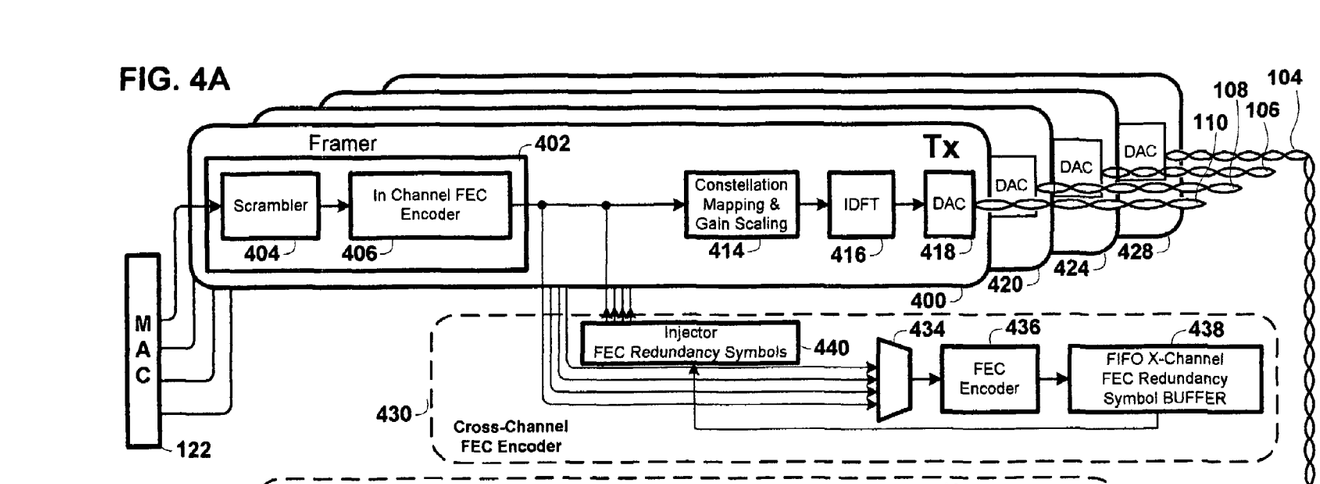
FIGS. 4A-4B are hardware block diagrams of an embodiment of the invention in which an opposing set of modems, physical or logical, are coupled to one another across more than one transmission line.
Figure 4B:
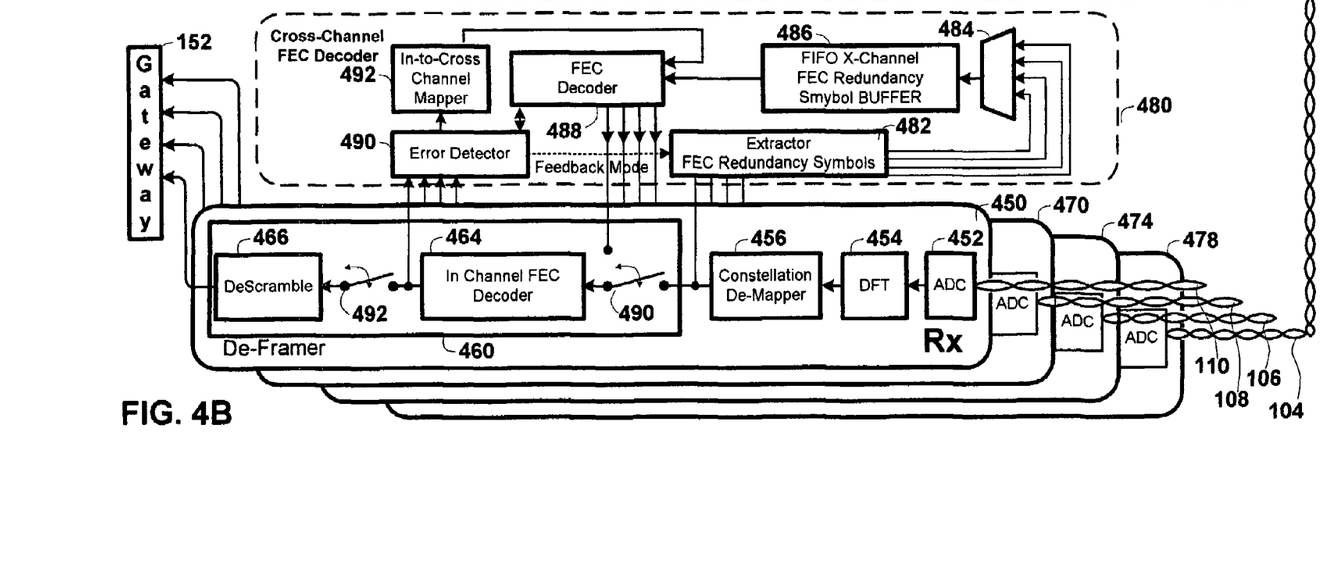

FIGS. 4A-4B are hardware block diagrams of an embodiment of the invention in which an opposing set of modems, physical or logical, are coupled across 'L=4' transmission lines for transport of data.

In FIG. 4A four transmit paths 400,420,424,428 are shown coupled at one end of transmission lines 110, 108, 106, 104 respectively. The corresponding receive paths of this modem/set of modems are not shown. The four transmit paths may be part of a single logical modem such as that shown in the following FIG. 5 or may be part of four corresponding discrete physical modems coupled to one another for purposes of cross-channel error correction. Data transmission begins at medium access control (MAC) 122 coupled to a network or other data source. (See FIG. 1). The components of a representative one of the transmit paths 400 are shown in detail and include: a framer 402, a constellation mapper and gain scaler 414, an inverse discrete Fourier transform (IDFT) component 416 and a digital-to-analog converter (DAC) 418. The framer includes a scrambler and an in-channel forward error correction (FEC) encoder 406. The framer accepts inbound data from the MAC 122 and performs one or more steps of in-channel block, state machine or turbo encoding. In an embodiment of the invention such encoding combines a block type Reed-Solomon encoding step followed by a trellis type state machine encoding. The constellation mapper and gain scaler component 414 converts the resultant in-channel codeword to a corresponding scaled sub-symbol which are provided to appropriate sub-channels a.k.a. tone bins of the IDFT. After transformation from the frequency-to-time domain in the IDFT the data is subject to digital-to-analog conversion and is modulated on to the corresponding transmission line 110. Each of transmit paths 420, 424 and 428 performs similar operations on corresponding portions of the transmitted data. In an embodiment of the invention all transmit paths are synchronized with one another and share substantially similar framing and symbol intervals.

In FIG. 4B four receive paths 450,470,474,478 are shown coupled at the opposite end of transmission lines 110, 108, 106, 104 respectively. The corresponding transmit paths of this modem/set of modems are not shown. The four receive paths may be part of a single logical modem such as that shown in the following FIG. 5 or may be part of four corresponding discrete physical modems coupled to one another for purposes of cross-channel error correction. The components of a representative one of the receive paths 450 are shown in detail and include: an analog-to-digital (ADC) converter 452, a discrete Fourier transform (DFT) 454, a constellation de-mapper 456 and a de-framer 466. The de-framer 480 includes an in-channel forward error correction (FEC) decoder 464 and a descrambler 466 coupled to one another by switch 492 and coupled to the constellation de-mapper by switch 490. The ADC performs an analog-to-digital conversion on the received data from transmission line 110. The DFT 454 converts this digital data from the time-to-frequency domain. The resultant sub-symbols/tones at the output are converted to raw data values by the constellation de-mapper 456. Next in the in-channel FEC decoder 464 one or more steps of in-channel block, state machine or turbo decoding are performed. In an embodiment of the invention such encoding combines a state machine type trellis type decoding followed by a block type Reed-Solomon decoding. The resultant decode of the codeword is de-scrambled in the de-scrambler 466 and output onto the corresponding network via gateway 152 (See FIG. 1). Each of receive paths 470, 474 and 478 performs similar operations on corresponding portions of the received data. All receive paths are synchronized with one another and share substantially similar framing and symbol intervals.

In this embodiment of the invention high throughput is achieved by adding a corresponding cross-channel FEC component in each opposing set(s) of modems shown in FIGS. 4A-4B. A cross-channel FEC encoder module 430 is shown coupled to the four transmit paths in FIG. 4A. The corresponding receive paths of this modem/set of modems and their corresponding cross-channel FEC decoder are not shown. Encoder 430 includes a multiplexer 434 a cross-channel FEC encoder component 436 a cross-channel FEC redundancy symbol buffer 438 and an injector 440. The multiplexer 434 has inputs coupled to the output of the corresponding framer on each of the transmit paths 400, 420, 424 and 428. Each in-channel codeword output by each corresponding in-channel FEC encoder in each of the four transmit path's framers is provided, via the multiplexer 434, as input to the cross-channel FEC encoder 436.

In cross-channel encoding the in-channel encoded data from all channels, e.g. the L=4 four channel embodiment shown in FIGS. 4A-4B, are mixed with one another in a predefined order and sequence and subject to cross-channel encoding by the cross-channel FEC encoder. From each cross-channel codeword resulting from the encoding process the redundancy symbol portion of the cross-channel codeword is stored in FEC cross-channel redundancy symbol buffer 438. What happens next depends on the cross-channel FEC mode utilized for the session. The cross-channel FEC redundancy symbols may depending on the type of FEC implemented be alternately identified as a parity bit/byte, or an FEC symbol. In this embodiment of the invention a session on the modem(s) may be initialized in one of two modes identified as feedforward mode and feedback mode.

In feedforward mode the cross-channel redundancy symbols are routinely transferred from the buffer and injected by injector 440 into the transmitted datastream for transport to a corresponding cross-channel decoder, e.g. cross channel decoder 480 on a receiving set of modem(s). To preserve the integrity of the in-channel encoded data, particularly where in-channel FEC includes either/both Reed-Solomon and Trellis encoding, the FEC redundancy symbols are injected into reserved tone bins/sub channels of the IDFT which are not subject to Trellis encoding.

In the feedback mode cross-channel redundancy symbols are stored on the transmit side in the cross-channel FEC redundancy symbol buffer 438 and only injected into the transmitted data stream in the event of an error condition signal from the opposing receiving modem. An error signal results when one or more of the four in-channel FEC decoders, e.g. FEC decoder 464, is unable to recover the original codeword. The error signal is generated by the receiving modems cross-channel FEC decoder, e.g. 480, and sent on the return path to the transmitting modem(s), where it is passed to the associated cross-channel FEC encoder, e.g. 430. The error signal identifies the relevant cross-channel FEC redundancy symbol, using an identification shared between the opposing modems cross-channel FEC components. This identification in alternate embodiments of the invention includes for example: a unique ID assigned to each redundancy symbol, or a time stamp, or a frame and super frame and set number. When there is a feedback of an error signal the corresponding FEC redundancy symbol(s) are located by the injector 440 in the cross-channel FEC redundancy symbol buffer and injected into the transmitted data stream for transport to and use by the receiving modem in decoding the data received in error. Injection in this mode may be either in the reserved or other tone bins, without effecting the integrity of the in-channel encoding process.

A cross-channel FEC decoder module 480 is shown coupled to the four receive paths in FIG. 4B. The corresponding transmit paths of this modem/set of modems and their corresponding cross-channel FEC encoder are not shown. The decoder 480 includes an extractor 482, a multiplexer 484 a cross-channel FEC redundancy symbol buffer 486, a cross-channel FEC decoder component 488, an in-channel FEC error detector 490 and a in-channel-to-cross-channel mapper 492. The extractor 482 has inputs coupled to the output of the corresponding constellation de-mapper on each of the receive paths 450, 470, 474 and 478. If the session(s) are initialized for feedforward mode then the extractor 484 continuously extracts redundancy symbols from the raw data output by each corresponding constellation de-mapper in each of the four receive path's. In an embodiment of the invention extraction may be made from assigned/reserved tone bins. Alternately, in feedback mode extraction is performed only intermittently subsequent to the detection of an error in the in-channel FEC decoder, e.g. decoder 464, and the generation of a resultant error signal by error detector 490. In either case redundancy symbols passed by multiplexer 484 into the FEC cross-channel redundancy symbol buffer 486. When one or more of the in-channel FEC decoders, e.g. decoder 464, is unable to recover a codeword, that error condition(s) is detected by error detector 490. The normally closed switches 490-492 are opened to form a feedback loop between the in-channel FEC decoder components and the cross channel FEC decoder module. This feedback loop allows the two orthogonal FEC decoders to be combined with one another to recover the error codeword(s). The error detector 490 passes the error codeword(s) to the in-to-cross channel mapper which parses the error codeword(s) and recombines them in to their corresponding cross-channel counterparts, e.g. with the appropriate tone ordering, and identifies the associated cross-channel redundancy symbols. In feedback mode an error signal is then sent to the transmitting modem(s) cross-channel encoder via the return channel(s) which identifies the required cross-channel redundancy symbols. These are then transmitted to the receiving mode, extracted from the received raw data and placed in the FIFO cross-channel redundancy symbol buffer 486 as discussed above. Alternately, if the session is initialized in feedforward mode the redundancy symbols are already in the buffer 486.

Once the cross-channel redundancy symbols are identified and buffered, each is combined with the corresponding error codeword mapped in the in-to-cross-channel mapper and subject to cross-channel FEC decoding in decoder 488. The resultant codewords are input to the corresponding transmit path and specifically the corresponding in-channel FEC decoder therein for another round of in-channel FEC decoding. There may be more than one iteration of this process until all codewords are recovered by the in-channel FEC decoders, after which the switches 490-492 are returned to the normally closed positions and the next portion of the received datastream is processed.

Figure 5:
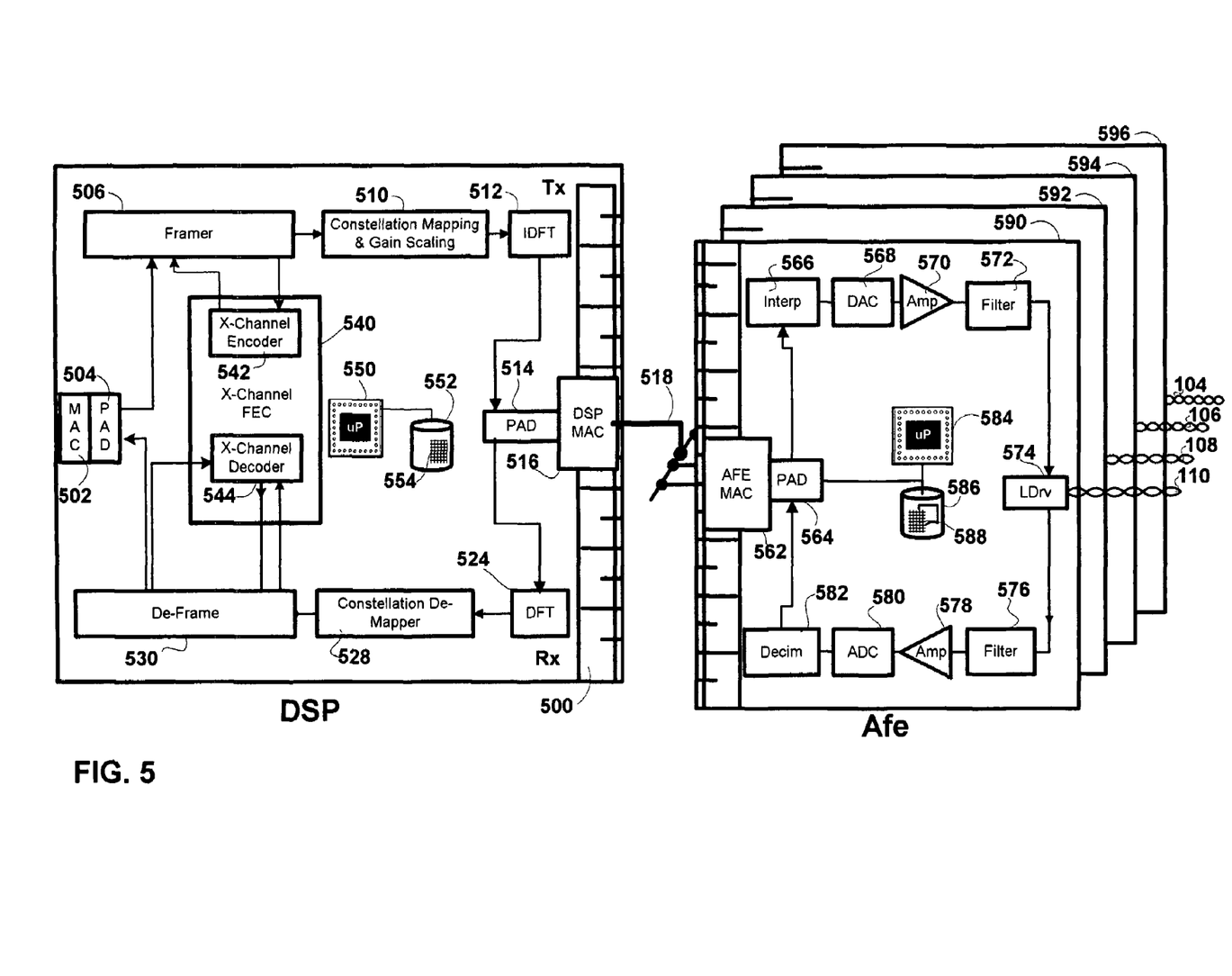
FIG. 5 is a hardware block diagram of an embodiment of the invention in which a single logical modem is configured to coupled to more than one transmission line.

FIG. 5 is a hardware block diagram of an embodiment of the invention in which a single logical modem including a digital signal processor (DSP) 500, and on or more analog front ends (AFE) is coupled to more than one transmission line to modulate and demodulate corresponding forward and reverse communication channels thereon. In the embodiment shown the logical modem comprising DSP 500 and AFE's 590,595,594,596 is coupled to a quantity L=4 four transmission lines 104, 106, 108, 110 respectively to handle each of four associated communication channels, one on each of the transmission lines. The DSP handles communications for each of the four channels by multiplexing communications on the transmit path and receive path thereof. This embodiment of the invention thus includes all the cross-channel FEC encoding and decoding functions discussed above in connection with FIGS. 4A-4B.

The components which form the transmit path of the DSP 500 include: medium access control (MAC) 502, packet assembler-disassembler (PAD) 504, framer 506, constellation mapper and gain scaler 510, IDFT 512, PAD 514, and MAC 516. The framer 506 includes both scrambler and in-channel FEC functionality as discussed above in connection with FIG. 4A and handles multiple channels via multiplexing the framing of the modem packets. This functionality is applied to all transmitted channels. Incoming data from the network coupled to MAC 502 may be received in network packets, e.g. conform with IEEE 802 or other network packet standard. This network data is packetized in PAD 504 with each resultant modem packet including a header including a channel identifier identifying which channel and associated transmission line will be used to transport the data contained in the packet. All modem packets irregardless of channel assignment share a common transmission path in the DSP in this embodiment of the invention. After inline encoding in the framer 506 each resultant in-channel codeword is subject to cross-channel encoding in the cross-channel encoder component 542 of the cross-channel FEC module 540 which performs in the manner discussed above in connection with the cross-channel encoder module 430 of FIG. 4A. Depending on the cross-channel FEC session mode, e.g. feedforward or feedback, the resultant cross-channel FEC redundancy symbol portion of each cross-channel codeword will either be injected into the transmit data stream for the corresponding channel or stored for transmission responsive to an error from an opposing receiving modem(s) (not shown). Constellation mapping and gain scaling is then performed by constellation mapper 510, the output of which is transformed from the frequency-to-time domain by IDFT 512. The transmit datastream output by the IDFT is processed in the PAD 514 for conversion to the transport structure required for transport to an associated one of the AFE's 590-596. In an embodiment of the invention individual ports rather than a common bus may be used to couple the DSP to each of the AFEs. In the embodiment of the invention shown in FIG. 5 the DSP 500 couples to all AFE's via a shared bus 518 which is itself packet based. The PAD 514 performs any required packet disassembly and/or reassambly required for transport on the shared bus 518 and the MAC 516 handles traffic on the bus 518.

The components which form the receive path of the DSP include: MAC 516, PAD 514, DFT 524, constellation demapper 528, de-framer 530, PAD 504, and MAC 502. The de-framer 506 includes both scrambler and in-channel FEC functionality as discussed above in connection with FIG. 4B and handles multiple channels via multiplexing the de-framing of the modem packets. Received data from all the AFE's coupled to MAC 516 is packetized in PAD 514 with each resultant modem packet including a header including a channel identifier identifying which channel and associated transmission line will be used to transport the data contained in the packet. All modem packets regardless of channel assignment share a common receive path in the DSP in this embodiment of the invention. After transformation from the time-to-frequency domain in the DFT 524, and de-mapping in the constellation de-mapper 528 the received datastream is passed to the de-framer. De-framing includes the above discussed in-channel FEC decoding and descrambling after which the received data is passed to the PAD 504 and MAC 502 to the associated network or gateway to which MAC 502 is coupled.

If session setup is in feedforward mode cross-channel redundancy symbols are extracted from the received datastream at the input of the de-framer 530 by the cross-channel decoder component 544 of the cross-channel FEC module 540. Alternately, they are extracted as received in response to an error signal generated by the cross-channel decoder component 544. When an error is detected in the in-channel FEC decoder component (see FIG. 4B) of the de-framer, the cross-channel decoder component 544 performs in the manner discussed above in connection with the cross-channel decoder module 480 of FIG. 4B. It performs in-to-cross channel mapping of the error codewords from the in-channel FEC, identifies the corresponding cross-channel redundancy symbols required to perform cross-channel decoding, sends any required error signal and extracts the resultant redundancy codes (in Feedback mode), performs the cross-channel decoding and submits the resultant codewords to the input of de-framer 530 for another round(s) of in-channel FEC decoding. The resultant received data is passed via PAD 504 and MAC 502 to the associated network or gateway to which they are coupled.

In an embodiment of the invention the DSP additionally includes a processor 550 with connections (not shown) to all transmit and receive path components and with storage 552 and program code and tables 554 used to coordinate the above discussed components to support multi-tone multi-line communications.

The components which form the transmit and receive paths of a representative AFE 110 are also shown. The components which form the transmit path of AFE 590 include: MAC 562, PAD 564, interpolator 566, DAC 568, amplifier 570, filter 572 and line driver 574 coupled to transmission line 110. The components which form the receive path of AFE 590 include: line driver 574, filter 576, amplifier 578, ADC 580, decimator 582, PAD 564 and MAC 562. In the embodiment of the invention shown in FIG. 5 the AFEs 590-596 couple to the DSP 500 via the packet bus 518. Each AFE handles communications for its own associated transmission line. In an alternate embodiment of the invention an AFE may handle more than one transmission line via channel multiplexing on the transmit and receive paths thereof. In an alternate embodiment of the invention each AFE additionally includes a processor 584 with connections (not shown) to all transmit and receive path components and with storage 586 and program code and tables 588 used to coordinate the above discussed components.

Figure 6:
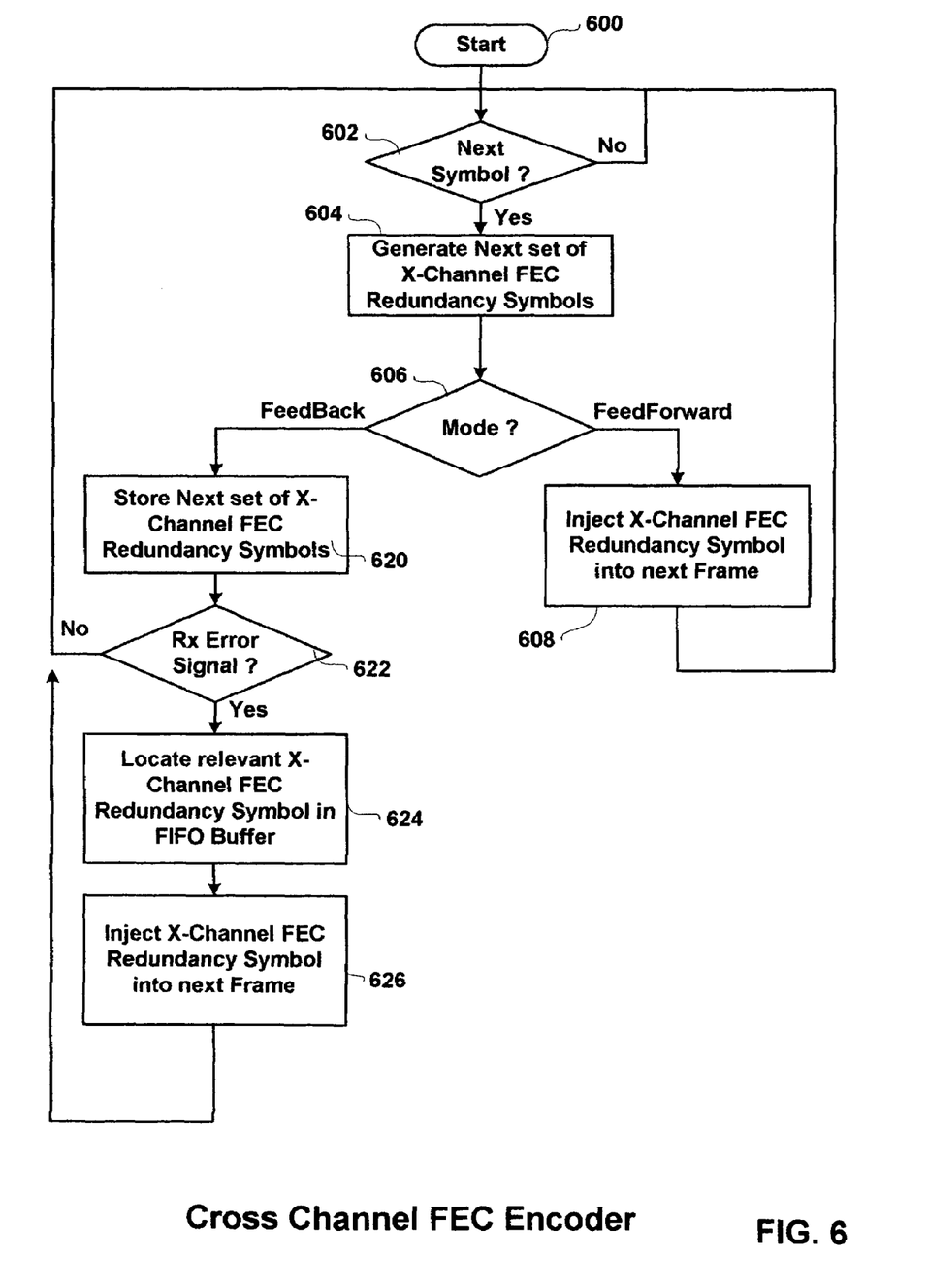
FIG. 6 is a process flow diagram of the processes performed by the encoder portion of the cross-channel FEC in accordance with an embodiment of the invention.

FIG. 6 is a process flow diagram of the processes performed by the encoder portion of the cross-channel FEC in accordance with an embodiment of the invention. After initialization 600 control passes to decision process 602 for the processing of the next portion of the data to be transmitted on each transmission lines. In the embodiment shown in FIG. 5 there are N=4 four transmission lines each transmitting data in synchronous symbol periods. Each frame of data is subject to in-channel FEC encoding in the framer. In-Such encoding may in an embodiment of the invention may include a block type FEC, e.g. Reed-Solomon coupled to a state machine type encoder, e.g. trellis type. After such in-channel encoding control passes to process 604 in which the in-channel encoded data on all 4 channels is subject to another round of encoding, in this case cross-channel encoding. In cross-channel encoding the in-channel encoded data from all four channels are mixed with one another in a predefined order and subject to cross-channel encoding. In an embodiment of the invention mixing is implemented using selected sets of data associated with specific tones/sub-channels from each of the four channels. For example a first set of data may be comprised of data associated with tones/sub-channels 0-7 in each of the four channels and the next set of data from tones 8-15 and so forth up to the number of tones on a channel. These are provided as input to the cross-channel FEC in a predefined order and sequence. This continues until all remaining sets of data for all the channels in the given symbol interval are input to the cross-channel FEC encoder. For each set of data a corresponding cross-channel FEC redundancy symbol is generated. Next in decision process 606 a determination is made as to the cross-channel processing mode initialized at startup. In an embodiment of the invention these modes include: a feedback and a feed forward mode.

In the feed forward mode cross-channel FEC redundancy symbols generated in process 604 are continuously injected into the transmitted data stream. To preserve the integrity of the in-channel encoded data, particularly where in-channel FEC includes either/both Reed-Solomon and trellis encoding, the FEC redundancy symbols are injected into reserved tone bins/sub channels of the IDFT which are not subject to Trellis encoding. In the feedback cross-channel FEC mode redundancy symbols are stored on the transmit side and only injected into the transmitted data stream in the event of an error condition signal from the opposing receiving modem.

If in decision process 606 a determination is made that cross-channel FEC encoding in the feed forward mode is effected then control passes to process 608. In process 608 the cross-channel FEC redundancy symbols are injected into the transmitted data stream in each symbol interval in the reserved tone bins. Alternately, if the session is setup for feedback mode then processing passes from decision process 606 to process 620. In process 620 the mixed sets of in-channel encoded data from each of the N=4 four channels are subject to cross-channel FEC encoding. The resultant redundancy symbols of each codeword are stored in a FIFO buffer, see FIG. 5, ref. 438, for use by the remote receiving modem when an error condition is detected.

Next, in decision process 622 a determination is made as to whether the receiving modem has detected an error condition in the in-channel FEC in-channel decoding and has sent an error signal to the transmitting modem on the reverse channel an error condition on one or more of the in-channel FEC decoders, see FIG. 5, ref 464. If such a feedback signal is received the transmitting modem in process 624 locates the corresponding FEC redundancy symbol in the cross-channel FIFO buffer using info received in the error signal from the receiving modem. A determination of the relevant cross-channel FEC redundancy symbol may be made on the basis of an ID, time stamp, or frame and super frame number, or a unique id assigned to each redundancy symbol by the receiver, for example.

Next in process 626 the required FEC redundancy symbol(s) are injected into the transmitted data stream for transport to and use by the receiving modem in decoding the data received in error. Injection in this mode may be either in the reserved or other tone bins, without effecting the integrity of the in-channel encoding process.

Figure 7:
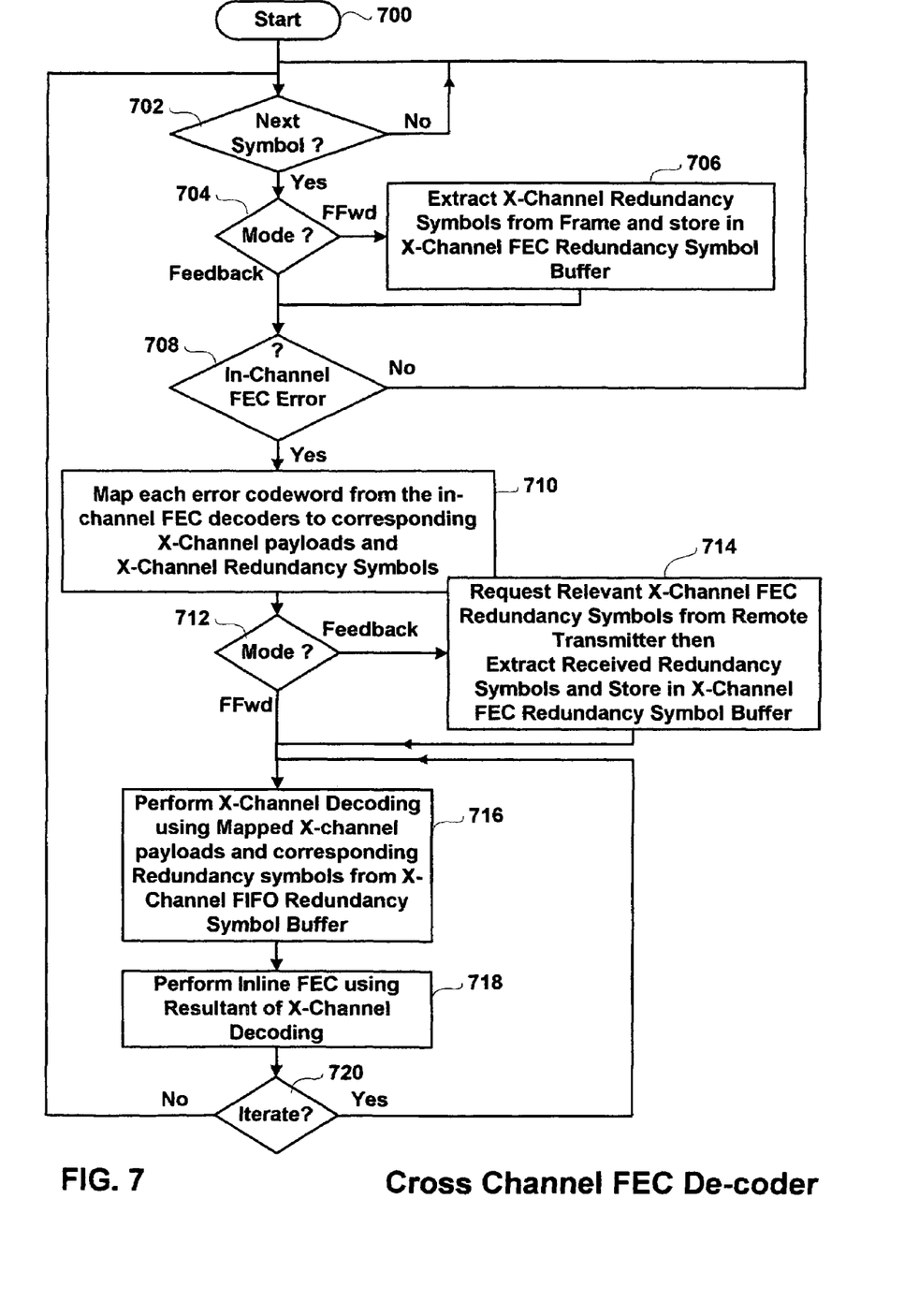
FIG. 7 is a process flow diagram of the processes performed by the decoder portion of the cross-channel FEC in accordance with an embodiment of the invention.

FIG. 7 is a process flow diagram of the processes performed by the decoder portion of the cross-channel FEC in accordance with an embodiment of the invention. After initialization 700 control passes to decision process 702 for the processing of the next portion of the data to be received on each channel. In the embodiment shown in FIG. 5 there are N=4 four channels each receiving data in synchronous symbol periods over four transmission lines. Received data is transformed from the time to frequency domain and de-mapped from a sub-symbol to a corresponding magnitude. Next in decision process 704 a determination is made as to whether the session was initialized for feed forward or feedback mode. If feedback mode is implemented control passes directly to decision process 708. Alternately, if feedforward mode is implemented control passes to process 706. In process 706 cross-channel redundancy symbols are extracted from each frame and stored in the FEC redundancy symbol buffer, see FIG. 4, 486. Control then passes to process 708.

In decision process 708 a determination is made as to whether one or more of the in-channel FEC decoders is unable to recover the original codeword. If there is no detected error then the received data is descrambled completing the receive processing is completed with the placement of the received data on the network to which the modem is coupled. If, alternately, an error in the in-channel FEC decoding is detected then control passes to process 710. In process 710 the error codeword(s) are passed to the in-channel to cross-channel mapper, see FIG. 4B 492, for mapping into corresponding cross-channel codewords and for identification of the corresponding cross-channel redundancy symbols. The in-to-cross channel mapper passes the cross-channel codewords to the decoder along with the identification of the corresponding cross-channel redundancy symbols. Control is then passed to decision process 712.

In decision process 712 the mode determination is again performed. If feedforward mode is implemented control passes directly to process 716. Alternately, if feedback mode is implemented control passes to process 714. In process 714 the required cross-channel redundancy symbols identified in process 710 are requested by the error detector using the return path from the receiving modem to the transmitting modem. The error detector also notifies the extractor 482 (See FIG. 4) that subsequently received data will include the required cross-channel redundancy symbols. Once these are received by the receiving modem they are extracted and stored in the cross-channel FEC redundancy symbol buffer. Control then passes to process 716.

In process 716 cross-channel decoding is performed by the FEC cross-channel decoder, see FIG. 4B 488 sing the error codeword(s) supplied by the mapper 492 (see FIG. 4B) and the cross-channel redundancy symbol combinations identified in the mapping process 710 and fetched from the cross-channel redundancy symbol buffer 486 (see FIG. 4B) by the decoder. Next in process 718 the resultant codewords are subject to another round of in-channel FEC decoding, see FIG. 4B 464. Control then passes to returns to decision process 720. In process 720 a determination is made as to whether iterative decoding is implemented and if so, whether it is required. If iterative decoding is implemented and required then control returns to process 716 for one or more rounds of iterative cross-channel and in-channel decoding. Subsequently control returns to decision process 702 for the onset of data processing in the next symbol interval. Alternately if iterative decoding is not implemented control returns from decision process 720 directly to decision process 702.

The in-channel FEC may employ one or more types of FEC including: state machine; e.g. trellis or convolutional; block, e.g. Reed Solomon or checksum or turbo type encoders in any combination. In an embodiment of the invention a block and state machine type encoders are utilized. An example of the former being a Reed-Solomon block encoder. An example of the latter being a trellis encoder. In an alternative embodiment of the invention in-channel encoding may require either a block type or state machine type encoder. Similar FEC implementations may be implemented for cross-channel encoder and decoder types.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone modem configured to transmit and receive communication channels each associated with a corresponding one of a plurality of transmission lines, the multi-tone modem comprising:

at least one in-channel forward error correction (FEC) component discretely encoding and decoding data from each communication channels transmitted and received over the plurality of transmission lines;

a cross-channel forward error correction module encoding data from all communication channels and buffering the corresponding cross-channel redundancy symbols of each resulting cross-channel codeword; and a cross-channel FEC decoder responsive to an in-channel error condition to cross-map and decode un-recoverable in channel errored codewords with corresponding cross-channel codeword counterparts and to map back resultant decoded cross-channel codewords to corresponding in-channel counterparts for input to the at least one in-channel FEC correction component for another round of in-channel FEC decoding; whereby errored codewords are recovered by exploiting orthogonality between the in-channel and cross-channel FEC decoders.

2. The multi-tone modem of claim 1, wherein further:

the cross-channel forward error correction module includes responsiveness to an error signal received on one of the communication channels to inject a corresponding one of the cross-channel redundancy symbols identified by the error signal into at least one of the communication channels transmitted by the multi-tone modem.

3. The multi-tone modem of claim 1, wherein further:

the cross-channel forward error correction module configured to inject the buffered cross-channel redundancy symbols into at least one of the communication channels transmitted by the multi-tone modem.

4. The multi-tone modem of claim 1, wherein the at least one in-channel forward error correction component further comprises:

at least one switch for switchably coupling each in-channel FEC decoder to the cross-channel FEC decoder responsive to an error condition of the in-channel codewords of one or more channels thereby switchably forming a feedback loop between the in-channel FEC decoder components and the cross-channel FEC decoder module which combines the two orthogonal FEC decoders with one another to recover the error codeword(s).

5. A means for error correction in a multi-tone modem configured to transmit and receive communication channels each associated with a corresponding one of a plurality of transmission lines, and the means comprising:
- means for discretely encoding and decoding in-channel codewords from each of the communication channels transmitted and received over the plurality of transmission lines;
- means for cross-channel encoding cross-channel codewords across all communication channels;
- means for detecting an error condition resulting from errored codewords in the decoding of in-channel codewords in the act of discretely encoding and decoding in-channel codewords; and responsive thereto:
    - means for decoding un-recoverable in-channel errored codewords with corresponding cross-channel codeword counterparts encoded by the means for cross-channel encoding; and
    - means for mapping back resultant decoded cross-channel codewords to corresponding in-channel counterparts for another round of in-channel decoding; thereby recovering errored codewords by exploiting orthogonality between the in-channel and cross-channel codewords.

6. The means for error correction of claim 5, further comprising:
- means for injecting a corresponding one of the cross-channel redundancy symbols identified by the error signal into at least one of the communication channels transmitted by the multi-tone modem, responsive to an error signal received on one of the communication channels.

* * * * *